(12) United States Patent
Johnsen et al.

(10) Patent No.: US 10,771,592 B2
(45) Date of Patent: *Sep. 8, 2020

(54) INTEROPERABILITY OF DISCOVERY AND CONNECTION PROTOCOLS BETWEEN CLIENT DEVICES AND FIRST SCREEN DEVICES

(71) Applicant: Google LLC, Mountain View, CA (US)

(72) Inventors: Stein Eldar Johnsen, Ranheim (NO); Alexander Taboriskiy, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/997,608

(22) Filed: Jun. 4, 2018

(65) Prior Publication Data

US 2018/0288193 A1 Oct. 4, 2018

Related U.S. Application Data

(63) Continuation of application No. 14/613,229, filed on Feb. 3, 2015, now Pat. No. 9,992,307.

(51) Int. Cl.
*G06F 9/451* (2018.01)
*H04L 29/06* (2006.01)
*H04L 29/08* (2006.01)

(52) U.S. Cl.
CPC ............. *H04L 67/42* (2013.01); *G06F 9/451* (2018.02); *H04L 67/141* (2013.01); *H04L 67/16* (2013.01); *H04L 67/36* (2013.01)

(58) Field of Classification Search
CPC ..................................................... G06F 9/451
See application file for complete search history.

(56) References Cited

U.S. PATENT DOCUMENTS

| 8,356,251 | B2* | 1/2013 | Strober ............. H04N 21/4222 715/740 |
| 2005/0289558 | A1 | 12/2005 | Illowsky et al. |
| 2006/0159109 | A1 | 7/2006 | Lamkin et al. |
| 2010/0275134 | A1* | 10/2010 | Baker ............... H04M 3/42068 715/753 |

(Continued)

FOREIGN PATENT DOCUMENTS

| CN | 103067234 A | 4/2013 |
| CN | 103475907 A | 12/2013 |

(Continued)

OTHER PUBLICATIONS

PCT International Search Report and Written Opinion for PCT/US2016/014011, dated Jun. 3, 2016, 9 Pages.

(Continued)

*Primary Examiner* — David E Choi
(74) *Attorney, Agent, or Firm* — Lowenstein Sandler LLP (57) ABSTRACT

A second screen application operating on a client device presents a deduplicated listing of devices in a user interface, each listed device associated with one or more coupling protocols. A selection of a listed device is received via the user interface with which to participate in a video display session. Application status information is obtained from a control server for a first screen application of the selected device, the application status information indicating whether the first screen application is in an existing video display session with a second client device. A coupling methodology is determined based on the indicated application status and coupling protocols available to the client device and the one or more coupling protocols of the first screen application; and the client device couples to the first screen application via the determined coupling methodology.

21 Claims, 7 Drawing Sheets

(56) References Cited

U.S. PATENT DOCUMENTS

| | | |
|---|---|---|
| 2012/0272148 A1 | 10/2012 | Strober |
| 2014/0006474 A1 | 1/2014 | White et al. |
| 2014/0280981 A1 | 9/2014 | Singhal et al. |
| 2014/0281988 A1* | 9/2014 | Watts ............... H04L 65/60 715/716 |
| 2014/0282660 A1 | 9/2014 | Oztaskent et al. |
| 2014/0282677 A1 | 9/2014 | Mantell et al. |
| 2015/0009916 A1 | 1/2015 | Wendling |
| 2015/0082184 A1* | 3/2015 | Kim ................... H04L 67/10 715/740 |
| 2015/0082241 A1* | 3/2015 | Kang ............... G06F 3/04845 715/803 |
| 2015/0229997 A1* | 8/2015 | Park ................ H04N 21/482 725/38 |
| 2015/0312648 A1* | 10/2015 | Zhang .............. H04N 21/8186 725/110 |
| 2016/0226999 A1* | 8/2016 | Johnsen ............... G06F 9/451 |

FOREIGN PATENT DOCUMENTS

| | | |
|---|---|---|
| CN | 104052783 A | 9/2014 |
| EP | 2779709 A2 | 9/2014 |
| JP | 2005524920 A | 8/2005 |
| JP | 2014514624 A | 6/2014 |

OTHER PUBLICATIONS

European Patent Application No. 167 46951, Extended European Search Report dated Jan. 30, 2018, 10 pages.

Dial—Discovery and Launch protocol specification—Version 1.6A"", Dec. 19, 2012 (Dec. 19, 2012), pp. 1-16, XP055076322, Retrieved from the Internet:URL:http://www.dial-multiscreen.org/dial-protocol-specification/DIAL-2ndScreenProtocol-1.6.4.pdf [retrieved on Aug. 23, 2013].

\* cited by examiner

FIG. 7

INTEROPERABILITY OF DISCOVERY AND CONNECTION PROTOCOLS BETWEEN CLIENT DEVICES AND FIRST SCREEN DEVICES

RELATED APPLICATIONS

This application is a continuation application of co-pending U.S. patent application Ser. No. 14/613,229, filed Feb. 3, 2015, entitled, "INTEROPERABILITY OF DISCOVERY AND CONNECTION PROTOCOLS BETWEEN CLIENT DEVICES AND FIRST SCREEN DEVICES," which is herein incorporated by reference.

BACKGROUND

Field of Disclosure

The described embodiments generally relate to interoperability of discovery and coupling protocols for client devices, and more specifically, to facilitate client device interoperability in establishing video sessions with a first screen device.

Description of the Related Art

There are a number of protocols (e.g., simple service discovery protocol based discovery and launch ("DIAL"), multicast domain name system based CAST V2 API ("CAST"), etc.) that are used for discovery and/or launch of an application on a first device (e.g., television) via an application on a second device (e.g., laptop). CAST is a non-published protocol underlying some communications for ANDROID and/or GOOGLE devices. The user of the application implementing the protocol specification may, for example, cause the content being displayed by a browser on a laptop to also be displayed via an application on a television. Several problems exist with displaying content using these protocols, including device duplication and protocol interoperability problems.

Device duplication is a problem where a discovered device is listed multiple times on the discovering device as an available display device. In some instances, a device supports multiple protocols for establishing a video session with the discovering device. In these cases, the device could be presented to the user via each path through which the device is discovered—and possibly with different names. For example, an application on a laptop could use DIAL discovery to discover a television and then DIAL to launch an application on the television. But the television could also support another discovery protocol (e.g., CAST) and/or have been previously manually paired with the laptop. A manual pairing occurs when, for example, a user enters a passcode provided by the television to the laptop, or vice versa, which results in the laptop being wirelessly coupled the television via a BLUETOOTH connection. In this example, without additional steps some the television will be shown to the user three times—and possibly under different names. This situation is confusing, affects user experience, and may result in the selection of a sub-optimal protocol.

Protocol interoperability is another problem that occurs, specifically in the context of a device attempting to join an existing session between two other devices. The underlying cause for this problem is that a session started using a particular protocol cannot be joined using another protocol, and on some devices discovery modules function independently. Attempting to join an existing session using a different protocol can fail or cause the disruption of the current session and a creation of a new session. For example, a television may support both DIAL and CAST protocols, device A may support only DIAL, and device B may support both DIAL and CAST. Device A creates a session with the television using the DIAL protocol, and at some later time device B attempts to join the session using CAST—resulting in disruption of the session. The disruption is caused because the session with the television cannot operate in both DIAL and CAST at the same time.

SUMMARY

In various embodiments, a control server facilitates interoperability of second screen applications operating on second screen devices (e.g., laptops) with first screen applications operating on first screen devices (e.g., televisions). The control server maintains pairing information describing whether the first screen applications have been previously manually paired to one or more second screen devices. The control server also maintains information indicating whether the first screen applications are participating in video display sessions with one or more second screen devices, and if so, what coupling protocols are being used in the video sessions.

A second screen application operating on a second screen device generates a deduplicated listing of devices available for connection using discovery information received from each device and pairing information received from the control server. The deduplicated listing of devices may include, for example, first screen devices, second screen devices, or some combination thereof. The second screen application presents via a user interface the deduplicated listing of devices to a user of the second screen device.

In some embodiments, the user selects, via the user interface, a listed first screen device with which to participate in a video display session. The second screen application obtains application information from the control server for the first screen application of the selected device. The application status information indicates whether the first screen application is in an existing video display session with some other second screen device. The second screen application determines a coupling methodology based on the indicated application status and coupling protocols available to the second screen device and the one or more coupling protocols of the first screen application.

In embodiments where the application status indicates that the first screen application is in an existing session with some other second screen device and that the session is using a particular coupling protocol, then the second screen application determines if the particular coupling protocol is also supported by the second screen device. If supported, the second screen device couples to the existing session via the particular coupling protocol. Otherwise, the second screen device couples indirectly to the existing session via the control server, where the second screen device and the control server communicate using a coupling protocol supported by the second screen device, and the control server and the first screen device couple via the particular coupling protocol being used in the existing session.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
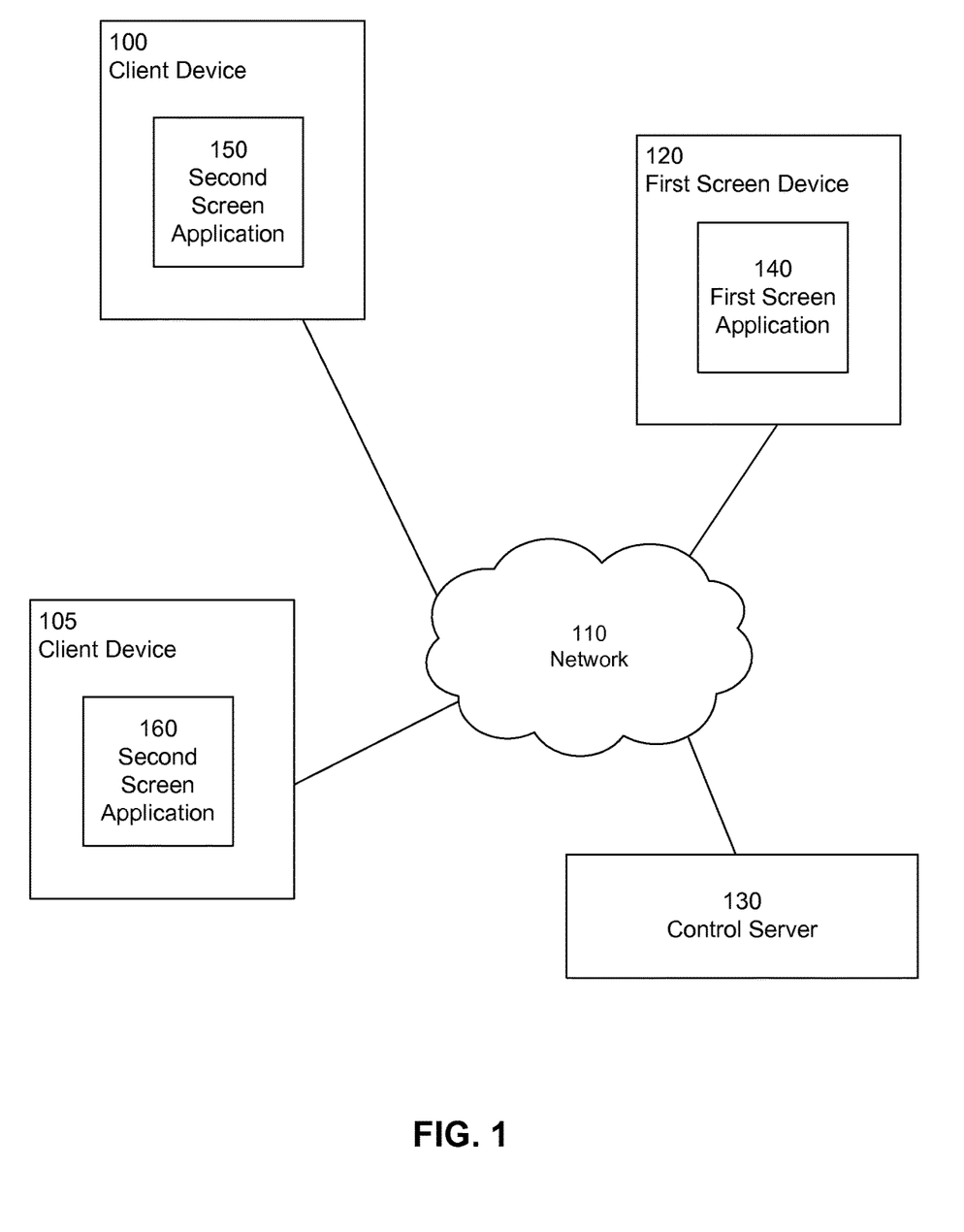
FIG. 1 is a block diagram illustrating an embodiment of an environment for facilitating client device interoperability with a first screen device.

FIG. 1 is a block diagram illustrating an embodiment of an environment for facilitating client device 100, 105 interoperability with a first screen device 120. The environment includes a client device 100 and a client device 105, each coupled by a network 110 to a first screen device 120 and control server 130. Here, only two client devices, one screen device and one control server are illustrated, but there may be multiple instances of each of these entities. For example, there may be thousands or millions of client devices 100, 105 and first screen devices 120 in communication with one or more control servers 130.

The network 110 provides a communication infrastructure between the client devices 100, 105, the first screen devices 120, and the control servers 130. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network, or some combination thereof. For example, the client devices 100, 105 and the first screen device 120 may communicate with each other using e.g., a WIFI coupling, and communicate with the control server 130 using an internet coupling.

The first screen device 120 and the client devices 100, 105 are computing devices that execute computer program modules—e.g., a web browser or other client application—which are stored on a non-transitory computer-readable medium and that allow a user to view and consume media content. The first screen device 120 and the client devices 100 are computing devices such as smartphones with an operating system such as ANDROID® or APPLE® IOS®, tablet computers, laptop computers, desktop computers, televisions, game consoles, or any other type of network-enabled device on which digital content may be presented to a user. For ease of description, we assume here without limitation that the first screen device 120 is a television.

Typical first screen devices 120 and/or client devices 100, 105 include the hardware and software needed to input and output sound (e.g., speakers and microphone) and images and couple to the network 110 (e.g., via Wi-Fi and/or 4G or other wireless telecommunication standards).

The first screen device 120 and the client devices 100, 105 couple to each other to establish sessions using one or more coupling protocols. A coupling protocol is a mechanism used to discover other local devices (e.g., client devices 100, 105 and/or first screen devices 120) and/or couple to discovered local devices to participate (e.g., create and/or join) in a session. Coupling protocols may include, e.g., DIAL, CAST, manual pairing, AIRPLAY, SMARTGLASS, MIRACAST, some other mechanism for discovering and launching an application (typically on a home network), or some combination thereof. The first screen device 120 and client devices 100, 105 are operable with specific types of coupling protocols, and in some cases the types of coupling protocols operable with the first screen device 120 and the client devices 100, 105 may differ. For example the first screen device 120 may be operable with DIAL and CAST, the client device 100 may be operable with CAST, and the client device 105 with DIAL.

The first screen device 120 includes a first screen application 140 that can be controlled from a coupled client device. For example, a user operating a client device 100 in a session with the first screen application 140 may cause, using the client device 100, content presented on the client device 100 to also be presented by the first screen application 140. The first screen application 140 generates an application identifier that identifies it as being an application of the first screen device 120. The first screen application 140 may generate the application identifier as part of installation of the first screen application 140 on the first screen device 120. The application identifier may be generated using, for example, a random number generator, a hash of a device identifier, some other method that creates an identifier that unambiguously identifies the first screen application 140, etc. Responsive to receiving a discovery request, the first screen application 140 provides the application identifier and available connection protocols to the requesting client device.

Additionally, in setting up a session with a client device the first screen application 140 registers its application status information describing the session (e.g., identify session, coupling protocol used in the session, etc.) to the control server 130. A client device 100, 105 may later request an application status of the first screen application 140 from the control server 130, and use this information to determine a preferred method of participating in a session with the first screen application 140. Accordingly, the risk of joining an existing session using a connection protocol inoperable with the session is removed.

The client device 100 includes a second screen application 150, which has similar functionality to second screen application 160. The second screen application 150 discovers devices that are available to couple to the client device 100 via, for example, WIFI, BLUETOOTH, etc. As part of the discovery process, the second screen application 150 obtains information from the control server 130 describing any previous manual pairings of the discovered devices. A manual pairing is a coupling between the second screen application 150 and a discovered device that was manually performed by a user. For example, a user may place two devices in a discovery mode, and then enter a passcode provided by one of the devices to the other device, which causes the devices to be paired. The second screen application 150 maintains a device list of the discovered devices. The second screen application 150 updates the device list with information about the discovered devices (e.g., application identifiers, coupling protocols, etc.). The second screen application 150 also updates the device list with information from the control server 130 describing any previous manual pairings of discovered devices. Often, a first screen application 140 may be associated with (i.e., discoverable by) multiple coupling protocols and/or manual pairings. The updated device list shows an entry for each of these coupling protocols and manual pairings—resulting in multiple entries in the updated device list for the same first screen application 140. The second screen application 150 performs a deduplication on the updated device list, for example by gathering entries in the device list by application identifier, and then creating a single device entry, for each application identifier, in a session interface that is used to interface with the second screen application 150. In some embodiments, a user is able to select this entry in order to request the client device 100 establish a session and/or join an existing session with the first screen application 140.

The session interface is a graphical user interface that the user uses to interface with the second screen application 150. For example, a user may instruct the second screen application 150 to discover other devices, couple to a particular first screen device 120, etc., using the session interface. The second screen application 150 presents (e.g., via the session interface) a listing of discovered devices and/or applications operating on those devices. The listing of discovered devices is generated using the entries created by deduplication of the device list. Accordingly, each entry in the listing corresponds to a particular application operating on a particular device.

The second screen application 150 receives a selection from the user indicating a desire to participate in a session with the first screen device 120 associated with the selection. For example, a user may select an entry in the listing of discovered devices that corresponds to the first screen application 140 operating on the first screen device 120. The second screen application 150 queries the control server 130 to determine if the device is already in an existing session, and if so, what is the coupling protocol associated with the existing session. The second screen application 150 determines a coupling methodology to couple the client device 100 to the first screen device 120 based on whether the first screen device 120 is in an existing session and the coupling protocols available to the client device 100 and the first screen device 120. A connection methodology may be, e.g., a direct coupling to the first screen application 140 or an indirect coupling to the first screen application 140 via the control server 130. The second screen application 150 then couples to the first screen application 140 based on the determined coupling methodology. Once coupled to the first screen application 140, a user of the second screen application 150 is able to have some control over the content presented by the first screen application 150. For example, the user may cause a video being presented by second screen application 150 to also be presented by the first screen application 140.

The control server 130 maintains information relating to first screen applications and client devices. The maintained information includes, e.g., pairings information and application status. Pairing information describes any devices (e.g., client devices 100, 105) that are manually paired with the first screen application 140. Manual pairing occurs when a user manually establishes a coupling between a second screen application and a first screen application 140. The control server 130 may receive pairing information from, e.g., the second screen applications 150, 160 and/or the first screen applications 140, and the control server 130 then updates a database with the received pairing information. Application status describes whether a first screen application 140 is in an existing session, and if so, what coupling protocol is being used in the existing session. The control server 130 receives application status information from the first screen application 140, and then the control server 130 updates a database with the received information. Responsive to receiving a request from a second screen application (e.g., second screen application 150), the control server 130 provides pairing information, application status information, or both to the second screen applications 150, 160.

In some embodiments, the control server 130 indirectly couples a second screen application 150 to a first screen application 140 to participate in a session. As noted above, the first screen device 120 has interoperability with a limited set of coupling protocols. In cases where the client device 100 is not operable with at least one of the same coupling protocols that work for the first screen device 120, the client device 100 may couple to the first screen device 120 indirectly through the control server 130. In this instance, the client device 100 communicates with the control server 130 using a coupling protocol that is available to both the client device 100 and the control server 130, and the control server 130 communicates with the first screen application 140 using a different coupling protocol that is available to both the first screen application 140 and the control server 130. The control server 130, in effect, translates the communications from the client device 100 to a format acceptable by the control server 130, and vice versa. Accordingly, a client device 100 that is not operable with a particular coupling protocol used in an existing session between the first screen device 120 and another client device (e.g., the client device 105), is able to join the session indirectly via the control server 130 using the particular coupling protocol. Joining an existing session in this manner allows the client device 100 to join the session without disruption of the session. For example, attempting to join a session using a coupling protocol different than the one currently being used in the session may cause the current session to fail, restart using the different coupling protocol, etc.

Figure 2:
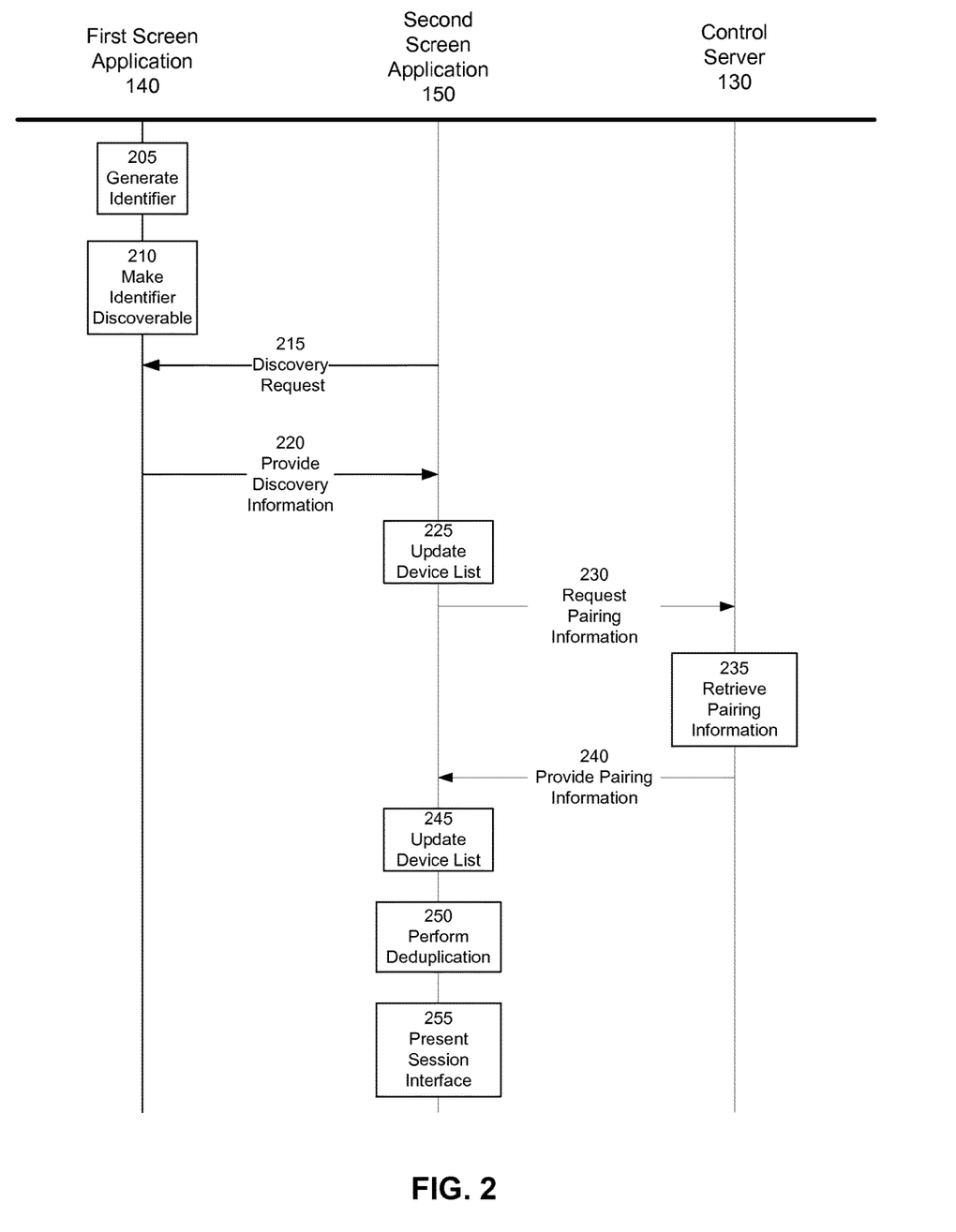
FIG. 2 is an interaction diagram of a method for discovering and deduplication of a first screen device according to an embodiment.

FIG. 2 is an interaction diagram showing the discovery process in more detail, specifically, FIG. 2 is an interaction diagram of one embodiment of a method for discovering and deduplication of a first screen device. In various embodiments, the method may include different and/or additional steps than those described in conjunction with FIG. 2. Additionally, in some embodiments, the steps may be performed in a different order than described in conjunction with FIG. 2.

A first screen application 140 operating on a first screen device 120 generates 205 an application identifier that is unique to the first screen application 140. The first screen application 140 makes 210 the application identifier discoverable to other requesting applications.

A second screen application 150 sends 215 a discovery request to the first screen application 140. The second screen application 150 may send the discovery request out via, for example, a local area network to devices on that network. Responsive to receiving a discovery request, the first screen application 140 provides 220 discovery information to the second screen application 150. Discovery information is information that describes how a client device (e.g., 100, 105) may couple to the first screen application 140. Discovery information includes, e.g., the application identifier and a listing of coupling protocols that may be used to establish a session with the first screen application 140, etc.

The second screen application 150 updates a device list using the received discovery information. The device list is a listing of devices that the second screen application 150 has discovered. The second screen application 150 adds an entry to the device list for every coupling protocol associated with the discovery information. Accordingly, there may be multiple entries for a single application identifier. For example, if the discovery information included an application identifier, X, and coupling protocols DIAL and CAST, the device list would include two entries for the first screen application 140 (e.g., [application identifier X: DIAL; application identifier X: CAST]).

The second screen application 150 requests 230 pairing information for the first screen application 140 from a control server 130. The request for pairing information includes the application identifier for the first screen application 140. Pairing information is information describing any devices (e.g., client devices 105) that the first screen application 140 may have been paired with manually. The request for pairing information includes the application identifier. The control server 130 retrieves 235 pairing information using the application identifier. For example, the control server 130 may access a database that stores a listing of manual pairings for various first screen applications, and may retrieve a specific listing of client devices that have been previously paired with a first screen application using the application identifier associated with the first screen application of interest. The control server 130 provides 240 the pairing information to the second screen application 150.

The second screen application 150 updates 245 the device list using the pairing information. The second screen application 150 adds an entry to the device list for every previous manual pairing listed in the pairing information. Accordingly, there may be multiple entries for a single application identifier. Thus, the device list may include multiple entries for a single application identifier that correspond to specific coupling protocols and/or manual pairings.

The second screen application 150 performs 250 a deduplication of the items in the device list. The second screen application 150 gathers entries in the device list by application identifier, and then creates a single device entry in a session interface that is mapped to the coupling protocols and/or manual pairings that are associated with the application identifier. The session interface is a graphical user interface by which a client device may discovery and/or establish a session with applications operating on other devices (e.g., the first screen device 130).

The second screen application 150 presents 255 the session interface including the device entry. The session interface presents a single device entry for each device (e.g., first screen device 130) that has been discovered and is available to establish a session with. For example, if three different televisions have been discovered and were available to establish a session with, there would be only three device entries, one for each television. In some embodiments, the selection of a device entry causes the session interface to present the different options for the second screen application 150 to couple to the first screen application 140. For example, the selection of the device entry for the first screen application 140 may cause the session interface to present a listing of protocols that are available to couple to the first screen application 140.

Figure 3:
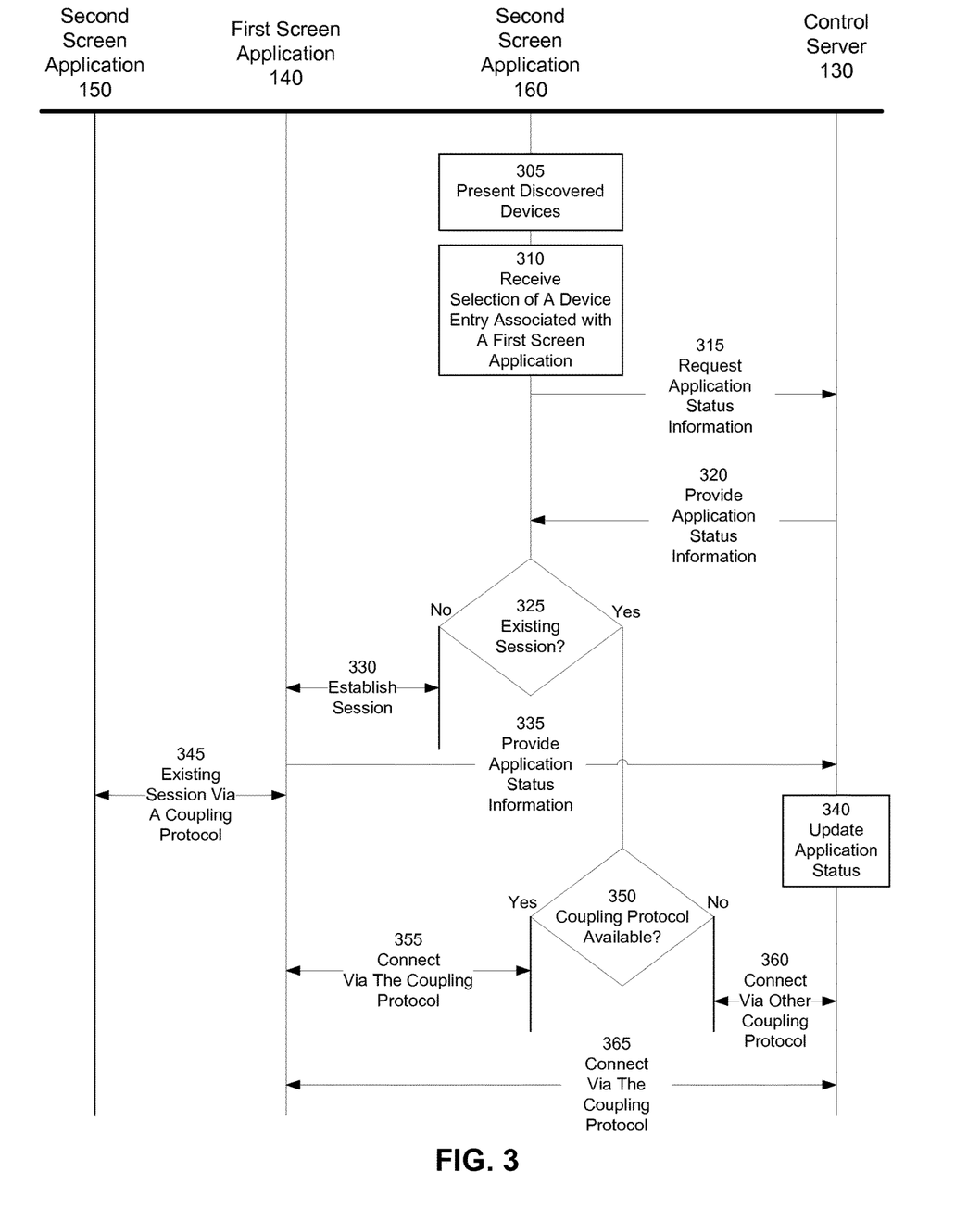
FIG. 3 is an interaction diagram of a method for establishing a session between a first screen application and one or more second screen applications according to an embodiment.

Turning now to a discussion of establishing sessions between devices, FIG. 3 is an interaction diagram of one embodiment of a method for establishing a session between a first screen application and one or more second screen applications. In various embodiments, the method may include different and/or additional steps than those described in conjunction with FIG. 3. Additionally, in some embodiments, the steps may be performed in a different order than described in conjunction with FIG. 3.

A second screen application 160 on a second screen device 105 presents 305 discovered devices that are local to the second screen device 105. For example, the second screen application 160 may present a session interface that shows a single device entry for each discovered device. The listing of device entries may be generated using the process described above with reference to FIG. 2. The second screen application 160 receives 310 a selection of a device entry that is associated with a first screen application 140. For example, the user may select a device entry for a first screen device 120, and the first screen application 140 is an application operating on the first screen device 120.

The second screen application 160 requests 315 application status information associated with the first screen application 140 from a control server 130. The request for application status information includes an application identifier associated with the first screen application 140. The control server 130 retrieves the application status information from a database using the application identifier. The database maintains application status information describing whether a first screen application is in an existing session, and if so, what coupling protocol is being used in the existing session. The control server 130 provides 320 the application status for the first screen application 140 to the second screen application 160.

The second screen application 160 determines 325 whether there is an existing session with some other client device using the received application status information. If there is not an existing session, the second screen application 160 establishes 330 a session with the first screen application 140.

In some instances, there may be multiple coupling protocols supported by the first screen device 120 that are also supported by the client device 105. In some embodiments, the second screen application 160 includes a table of ranked coupling protocols. In some embodiments, the coupling protocols are ranked by an administrator of the second screen application 160. The administrator may rank the coupling protocols in any order. In some embodiments, the coupling protocols may be ranked by the amount of control over a session the coupling protocols provide to a user. For example, the table would rank CAST higher than DIAL, as CAST provides greater volume adjustment control than DIAL. In some embodiments, the second screen application 160 selects a preferred coupling protocol that is the highest ranking coupling protocol in the table that is available to both the client device 105 and the first screen device 120 CAST CAST. In other embodiments, the second screen application 160 may prompt the user to select the coupling protocol used to establish a session.

The steps in establishing a session are generally coupling protocol specific, however, regardless of the coupling protocol selected the first screen application 140 provides 335 application status information to the control server 130 indicating that the first screen application 140 is in a session with the second screen application 160 and that the session was started using a particular coupling protocol. The control server 130 then updates 340 the application status information associated with the first screen application 120 with the received application status information. For example, the control server 130 may update a database entry associated with the application identifier of the first screen application 140 with the received application status information.

In some embodiments, the second screen application 160 determines that there is an existing session 345 with some other client device (e.g., a second screen application 150) via a coupling protocol using the application status information from the control server 130. The second screen device 160 determines 350 whether the coupling protocol is also available to the client device 105 (i.e., the coupling protocol is supported by the client device 100). In embodiments where the coupling protocol is supported, the second screen application 150 couples 355 to the first screen application 140 using the coupling protocol. As the coupling to the first screen application 140 uses the same protocol that is used in the existing session 345, the second screen application 150 is able to couple 355 to the existing session 345 without disrupting (e.g., causing failure, causing the session to restart, etc.) the existing session 345.

In some embodiments where the coupling protocol is not available (i.e., not supported by the client device 100), the second screen application 150 couples to the session via the control server 130. The coupling 360 to the control server 130 is via some other protocol that is supported by the client device 100. The control server 130 then couples to the first screen application using the coupling protocol that is used in the existing session 345. As the control server 130 is coupling to the existing session 345 using the coupling protocol for the session, the control server 130 is able to effectively join the second screen application 150, via the control server 130, to the existing session without disruption.

In some instances (not shown in FIG. 3) there are no existing sessions between the first screen application 140 and another client device and the coupling protocols available to the client device 105 are different from the coupling protocols available to the first screen device 120. Accordingly, the client device 105 is not able to directly couple to and establish a session with the first screen application 140. In some embodiments, the client device 105 couples to the first screen application 140 indirectly through the control server 130. For example, the client device 105 communicates with the control server 130 using a coupling protocol available to the client device 105 and the control server 130, the control server 130 translates the information received from the client device 105 into a format compatible with a coupling protocol that is supported by the first screen device, and communicates with the first screen application using the coupling protocol.

Figure 4:
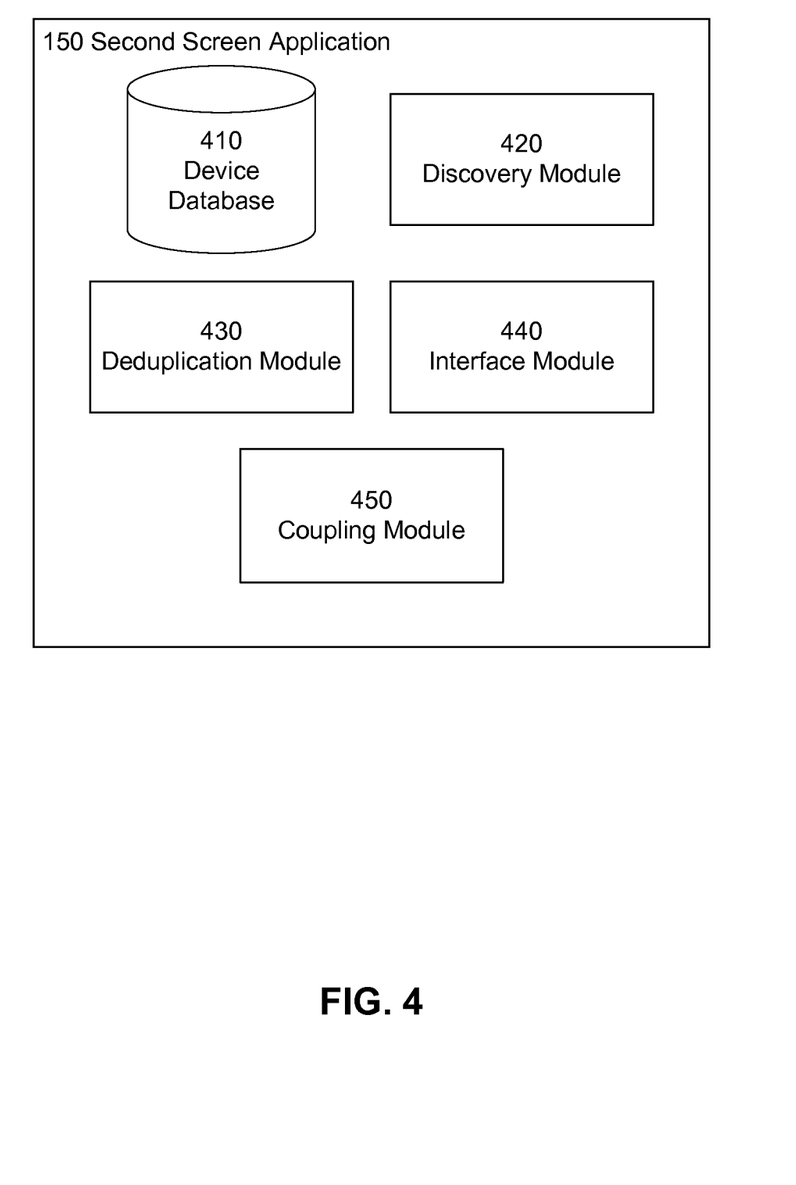
FIG. 4 is a block diagram illustrating a detailed view of a second screen application of FIG. 1, according to one embodiment.

Turning now to a discussion of the structure of the second screen application 150, FIG. 4 is a block diagram illustrating a detailed view of modules within the second screen application 150 according to one embodiment. Some embodiments of the second screen application 150 have different modules than those described here. Similarly, the functions can be distributed among the modules in a different manner than is described here. The second screen application 150 are comprised of modules including a device database 410, a discovery module 420, a deduplication module 430, an interface module 440, and a coupling module 450. Moreover, while the discussion below is in the context of the second screen application 150, it also equally applies to the second screen application 160.

The device database 410 stores information relating to discovery and session participation with first screen applications 140 on first screen devices 120. Information relating to discovery and session participation includes a device list. A device list is a listing of information associated with devices (e.g., client devices and/or first screen devices 120) that have been discovered. The information associated with each device in the device list may include, e.g., an application identifier a particular application operating on the device, coupling protocols compatible with device, pairing information, or some combination thereof.

The discovery module 420 performs discovery operations for the second screen application 150. The discovery module 420 sends discovery requests to local devices (e.g., via WIFI, BLUETOOTH, etc.) to identify devices (e.g., first screen devices 120 and/or other client devices) that are locally available for discovery. The discovery module 420 receives discovery information from any discovered first screen devices 120. The discovery information includes both an application identifier for the discovered first screen application 140 and coupling protocols that may be used to establish a session with the first screen application 140.

The discovery module 420 updates the device list with the received discovery information. The discovery module 420 adds an entry to the device list for every coupling protocol associated with the discovery information. Accordingly, there may be multiple entries for a single application identifier (e.g., [application identifier X: DIAL; application identifier X: CAST . . . ]).

The discovery module 420 obtains pairing information associated with the discovered first screen devices 120 from a control server 130. The pairing information is information that describes any client devices that a first screen application 140 may have been paired with manually. The discovery module 420 updates the device list with the pairing information received from the control server 130. The discovery module 420 adds an entry to the device list for every manual pairing identified in the pairing information. Accordingly, there may be multiple entries for both coupling protocols and/or manual pairings for a single application identifier (e.g., [application identifier X: DIAL; application identifier X: CAST; application identifier X: manual pairing to client device 1; application identifier X: manual pairing to client device 2; . . . ]).

Additionally, in some embodiments, the discovery module 420 may generate an identifier that is unique to the client device 100. Responsive to receiving a discovery request from some other client device (e.g., client device 105), the discovery module 420 provide to the requesting client device the identifier and a listing of coupling protocols available to couple to the client device 100.

The deduplication module 430 performs device deduplication using the updated device list. The deduplication module 430 gathers entries in the updated device list by application identifier, and then creates a single device entry for a session interface that is mapped to the coupling protocols and/or manual pairings that are associated with the application identifier.

The interface module 440 generates a session interface using one or more device entries. The session interface is a graphical user interface by which the client device 100 may discover and/or establish a session with applications operating on other devices (e.g., the first screen device 130). The session interface presents one or more of the device entries to a user of the client device 100. Each device entry is associated with a single first screen device 120. In some embodiments, a device entry may alternatively be associated with some other client device (e.g., client device 105).

Responsive to receiving a selection of a device entry for a particular device (e.g., first screen device 120), the coupling module 350 obtains an application status of an application associated with the selected device. For example, the coupling module 350 may obtain from the control server 130 application status information for a first screen application 140 operating on the selected first screen device 120. The application status information is information describing whether a first screen application is in an existing session, and if so, what coupling protocol is being used in the existing session.

The coupling module 450 determines a coupling methodology using the received application status information and coupling protocols available to the client device 100. For example, if the application status information indicates that there no existing session, the coupling module 450 may establish a session with the first screen application 140 using a preferred protocol. In some embodiments, the preferred protocol is a coupling protocol selected by the user of the client device 100. In alternate embodiments, the coupling module 450 selects the preferred coupling protocol based on what coupling protocol that is available to both the first screen device 120 the client device 100 provides the most control to the user of the client device 100. For example, assuming that DIAL and CAST are available coupling protocols, the coupling module 450 may select CAST as the coupling protocol because it would provide additional volume adjustment control over the DIAL coupling protocol. Additionally, in embodiments where there are no existing sessions and the coupling protocols available to the client device 105 are different from the coupling protocols available to the first screen device 120, the coupling module 450 couples to the first screen application 140 indirectly through the control server 130.

In embodiments, where the application status information indicates that the first screen device 120 is in an existing session with another client device (e.g., client device 105) using a specific coupling protocol, the coupling module 450 determines whether the specific coupling protocol is also available to the client device 100 (i.e., the coupling protocol is supported by the client device 100). If the coupling protocol is supported, the coupling module 450 couples to the first screen application 140 using the particular coupling protocol. If the particular coupling protocol is not available (i.e., not supported by the client device 100), the coupling protocol couples to the session via the control server 130. In this case, the coupling to the session is indirect, in the sense that the client device 100 couples to the control server 130 using a protocol that is supported by the client device 100, and the control server 130 then couples to the session using the particular coupling protocol. In either case, the client device 100 is joining the existing session via the particular coupling protocol being used in the existing session. Accordingly, the client device 100 is able to effectively join the existing session without disruption, which might otherwise occur if a coupling to an existing session was attempted using a coupling protocol difference from the coupling protocol being used in the existing session.

Figure 5:
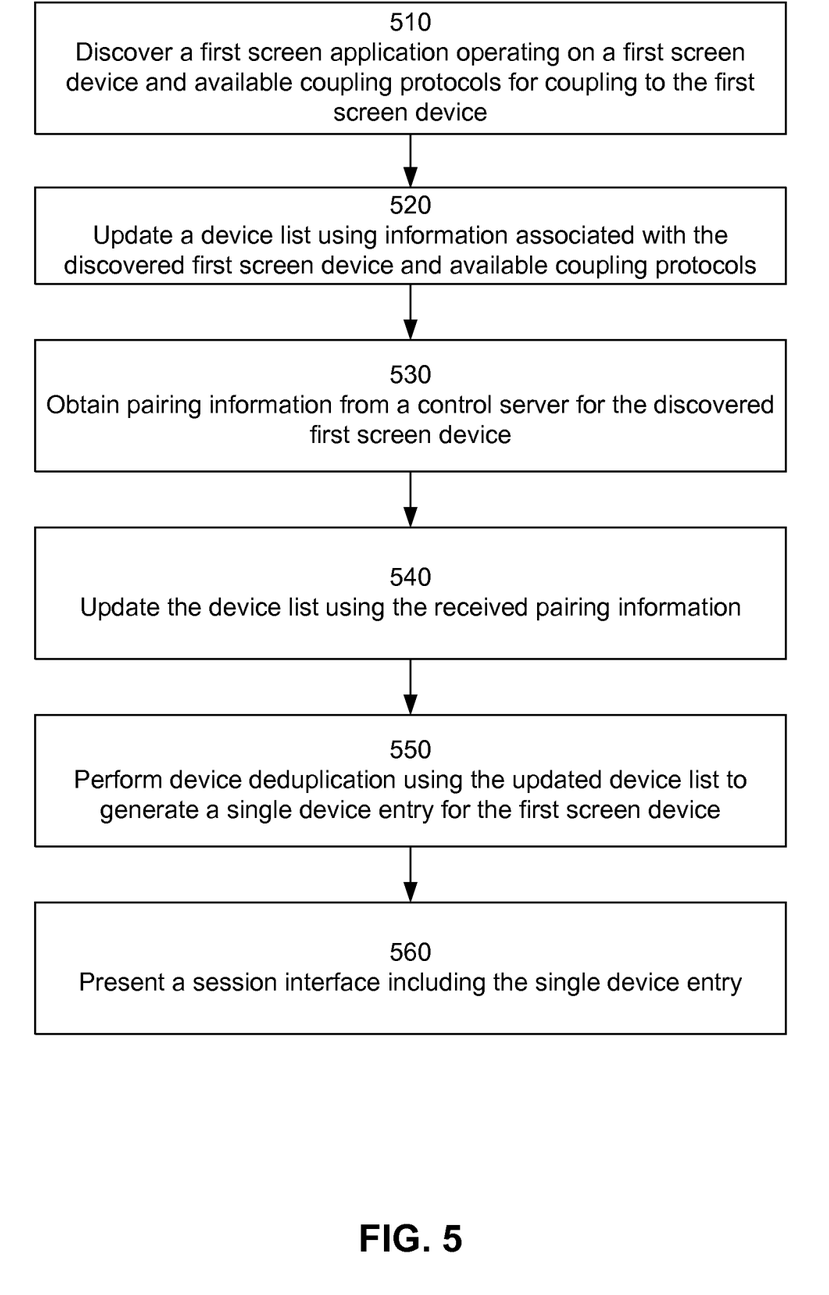
FIG. 5 is a flowchart illustrating a process of performing device deduplication as part of device discovery according to one embodiment.

FIG. 5 is a flowchart illustrating a process of performing device deduplication as part of device discovery according to one embodiment. In one embodiment, the process of FIG. 5 is performed by the client device 100. Other entities may perform some or all of the steps of the process in other embodiments. Likewise, embodiments may include different and/or additional steps, or perform the steps in different orders.

The client device 100 discovers 510 a first screen application 140 operating on a first screen device 120 and available coupling protocols for coupling to the first screen device 120. For example, the client device 100 may send out one or more discovery requests via, e.g., BLUETOOTH, WIFI, etc. The discovered first screen device 120 provides the client device 100 with discovery information that includes an application identifier and available coupling protocols that are supported by the first screen device 120.

The client device 100 updates 520 a device list using information (e.g., some or all of the discovery information) associated with the first screen device 120 and available coupling protocols. The client device 100 adds an entry to the device list for each coupling protocol, such that each entry is also associated with the application identifier. Accordingly, there may be multiple entries for a single application identifier (e.g., [application identifier X: DIAL; application identifier X: CAST]).

The client device 100 obtains 530 pairing information from a control server 130 for the first screen device 120. For example, the client device 100 may request pairing information associated with the first screen application 140 and/or first screen device 120 from the control server 130. The pairing information received from the control server 130 describes any devices (e.g., client devices 105) which the first screen application 140 may have been paired with manually. The client device 100 updates 540 the device list using the pairing information. As the client device 100 adds an entry to the device list for every application identifier that is associated a manual pairing, there may be multiple entries for a single application identifier. For example, the device list may contain entries for both coupling protocols and manual pairings associated with the same application identifier (e.g., [application identifier X: DIAL; application identifier X: CAST; application identifier X: manual pairing to device 1; application identifier X: manual pairing to device 2; . . . ]).

The client device 100 performs 540 device deduplication using the updated device list. The client device 100 gathers entries in the device list by application identifier, and then creates a single device entry in a session interface that is mapped to the coupling protocols that are associated with the application identifier. The client device 100 presents the session interface including the single device entry for the first screen device 120 to the user, along with any other device entries which had been previously discovered. Accordingly, the listing device entries presented by the session interface is a deduplicated listing of devices, where each entry corresponds to a different device.

Figure 6:
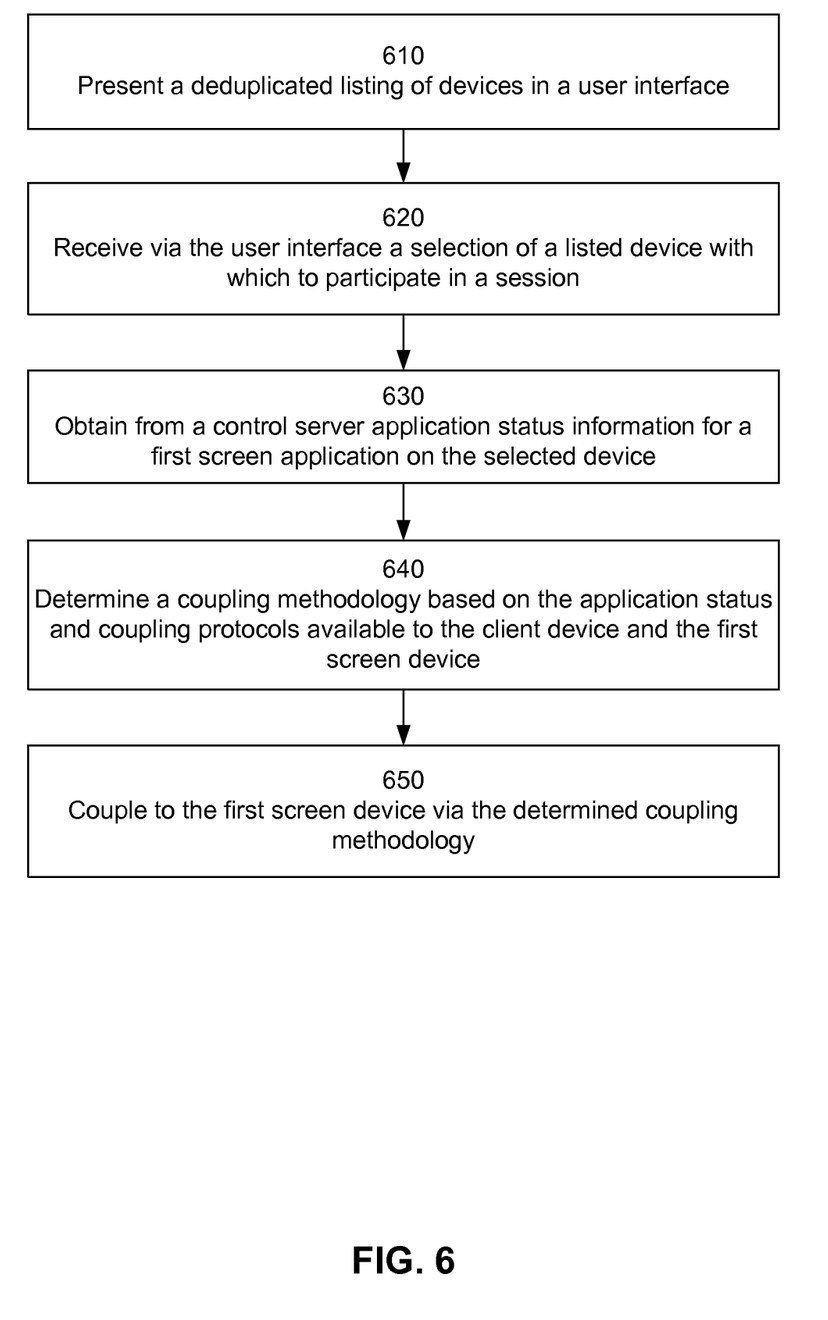
FIG. 6 is a flowchart illustrating a process for establishing a session between a first screen application and a second screen application according to one embodiment.

FIG. 6 is a flowchart illustrating a process for establishing a session between a first screen application and a second screen application according to one embodiment. In one embodiment, the process of FIG. 6 is performed by the client device 100. Other entities may perform some or all of the steps of the process in other embodiments. Likewise, embodiments may include different and/or additional steps, or perform the steps in different orders.

The client device 100 presents 610 a deduplicated listing of devices in a user interface to a user of the client device 100. The deduplicated listing may be generated using, e.g., the process described above with reference to FIG. 5.

The client device 100 receives 620 a selection of a listed device with which to participate in a session. In some embodiments, the session may be, for example, a video display session. In this context, participate may refer to joining an existing session with the selected device or establishing a session with selected device.

The client device 100 obtains 630 from a control server 130 an application status of a first screen application 140 on the selected device. The client device 100 determines 640 a coupling methodology based on the application status and coupling protocols available to both the client device 100 and the first screen device 100. In embodiments, where the application status indicates that there are no existing sessions, the client device 100 couples 650 to the first screen application 140 using a preferred coupling protocol (e.g., one that provides the most control to the user of the client device 100) that is available to both the client application 100 and the first screen application 120. In embodiments where the application status indicates that the first screen application 140 is in an existing session with a client device 105 and that the session is using a particular coupling protocol, then the client device 100 determines if the particular coupling protocol is also supported by the client device 100. If supported, the client device 100 couples 650 to existing session via the particular coupling protocol. Otherwise, the client device 100 couples indirectly to the existing session via the control server 130, where the client device 100 and control server 130 communicate using a coupling protocol supported by the client device 100, and the control server 130 and the first screen application 140 couple via the particular coupling protocol being used in the existing session.

Figure 7:
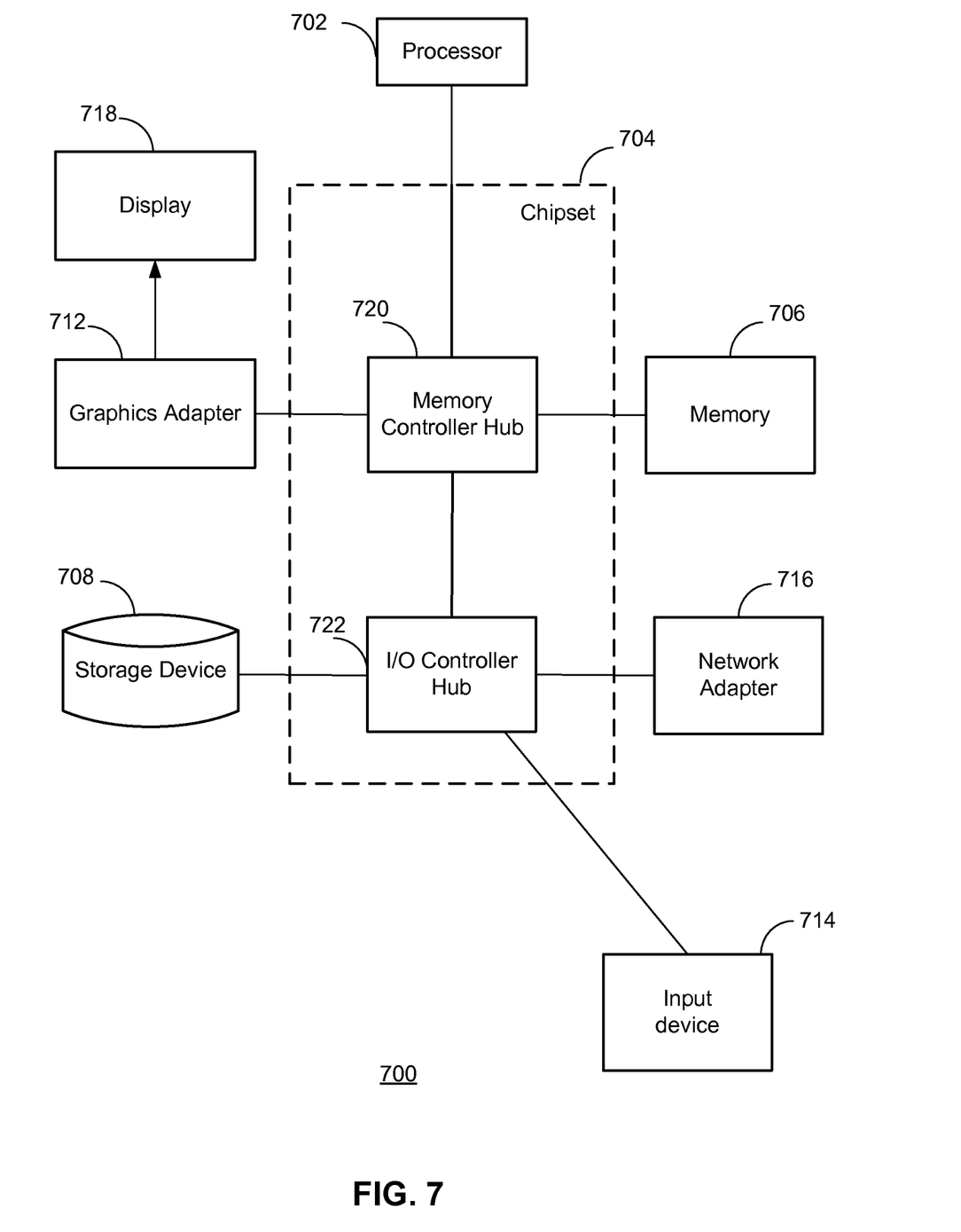
FIG. 7 is a block diagram illustrating an example computer for implementing the entities shown in FIG. 1.

Turning now to a discussion of the implementation of client devices 100, 105, the first screen device 120, and/or the control server 130, FIG. 7 is a block diagram illustrating an example computer 700 for implementing the entities shown in FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input device 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information on the display 718. The network adapter 716 couples the computer 700 to one or more computer networks.

The computer 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computers 700 used by the entities of FIG. 1 can vary depending upon the embodiment and the processing power required by the entity. In some embodiments, the client device 100 may interact with one or more servers working together to provide the functionality described herein. For example, the control server 130 may include multiple computers 700 communicating with each other through a network such as in a server farm to provide the functionality described herein. The computers 700 can lack some of the components described above, such as graphics adapters 712, and displays 718.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, media feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for facilitating client device interoperability with a first screen device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for facilitating interoperability between a first screen device and a second screen device, the method comprising:
   discovering, by the second screen device, a first screen application operating on the first screen device and a plurality of coupling protocols available to connect to the first screen device;
   providing, by the second screen device, a device list based on the discovering, the device list including a plurality of entries each associated with the first screen application and a respective coupling protocol of the plurality of coupling protocols;
   obtaining, by the second screen device, pairing information for the first screen application from a control server;
   updating, by the second screen device, the device list using the pairing information from the control server;
   performing, by the second screen device, device deduplication using the updated device list to generate a deduplicated entry for the first screen application; and
   presenting, by the second screen device, the deduplicated entry for the first screen application in a user interface.

2. The method of claim 1, wherein providing, by the second screen device, the device list based on the discovering comprises:
   adding an entry to the device list for each of the plurality of coupling protocols, wherein each added entry includes an application identifier of the first screen application and an identifier of a respective coupling protocol of the plurality of coupling protocols.

3. The method of claim 2, wherein the application identifier of the first screen application is generated by the first screen application and provided to the second screen device in response to a discovery request of the second screen device.

4. The method of claim 1, wherein the pairing information for the first screen application identifies one or more client devices with which the first screen application has been paired manually using a passcode.

5. The method of claim 4, wherein updating the device list using the pairing information comprises:
   adding an entry to the device list for each of the one or more client devices with which the first screen application has been paired manually, wherein each added entry includes an application identifier of the first screen application and an identifier of a respective client device with an indication of a manual pairing.

6. The method of claim 5, wherein performing device deduplication using the updated device list comprises:
   gathering entries that are associated with the first screen application in the updated device list using the application identifier of the first screen application; and
   creating a single entry that includes the application identifier of the first screen application, the single entry being the deduplicated entry reflecting the plurality of coupling protocols and the one or more client devices with which the first screen application has been paired manually.

7. The method of claim 1, further comprising:
   receiving a user selection of the deduplicated entry for the first screen application;
   requesting application status information associated with the first screen application from the control server;
   receiving the application status information associated with the first screen application from the control server; and
   determining, based on the application status information, whether the first screen application has an existing session with any other client devices.

8. The method of claim 7, further comprising:
   responsive to determining that the first screen application does not have an existing session with any other client devices, establishing a session with the first screen application.

9. The method of claim 8, wherein establishing the session with the first screen application comprises:
   identifying, by the second screen device, rankings of the plurality of coupling protocols; and
   selecting, from the plurality of coupling protocols, a coupling protocol with a highest ranking for establishing the session with the first screen application.

10. The method of claim 8, wherein establishing the session with the first screen application comprises:
    receiving a user selection of one of the plurality of coupling protocols for establishing the session with the first screen application.

11. The method of claim 7, further comprising:
    responsive to determining that the first screen application has an existing session with another client device, identifying a coupling protocol of the existing session, and determining whether the coupling protocol of the existing session is supported by the second screen device.

12. The method of claim 11, further comprising:
    responsive to determining that the coupling protocol of the existing session is supported by the second screen device, connecting with the first screen application using the coupling protocol of the existing session.

13. The method of claim 11, further comprising:
    responsive to determining that the coupling protocol of the existing session is not supported by the second screen device, connecting with the first screen application via the control server.

14. A non-transitory computer readable medium comprising instructions, which when executed by a processor, cause the process to perform operations for facilitating interoperability between a first screen device and a second screen device, the operations comprising:
    discovering, by the second screen device, a first screen application operating on the first screen device and a plurality of coupling protocols available to connect to the first screen device;
    providing, by the second screen device, a device list based on the discovering, the device list including a plurality of entries each associated with the first screen application and a respective coupling protocol of the plurality of coupling protocols;
    obtaining, by the second screen device, pairing information for the first screen application from a control server;
    updating, by the second screen device, the device list using the pairing information from the control server;
    performing, by the second screen device, device deduplication using the updated device list to generate a deduplicated entry for the first screen application; and
    presenting, by the second screen device, the deduplicated entry for the first screen application in a user interface.

15. The non-transitory computer readable medium of claim 14, wherein providing, by the second screen device, the device list based on the discovering comprises:
adding an entry to the device list for each of the plurality of coupling protocols, wherein each added entry includes an application identifier of the first screen application and an identifier of a respective coupling protocol of the plurality of coupling protocols, wherein the application identifier of the first screen application is generated by the first screen application and provided to the second screen device in response to a discovery request of the second screen device.

16. The non-transitory computer readable medium of claim 14, wherein the pairing information for the first screen application identifies one or more client devices with which the first screen application has been paired manually using a passcode.

17. The non-transitory computer readable medium of claim 14, wherein updating the device list using the pairing information comprises:
adding an entry to the device list for each of the one or more client devices with which the first screen application has been paired manually, wherein each added entry includes an application identifier of the first screen application and an identifier of a respective client device with an indication of a manual pairing.

18. The non-transitory computer readable medium of claim 17, wherein performing device deduplication using the updated device list comprises:
gathering entries that are associated with the first screen application in the updated device list using the application identifier of the first screen application; and
creating a single entry that includes the application identifier of the first screen application, the single entry being the deduplicated entry reflecting the plurality of coupling protocols and the one or more client devices with which the first screen application has been paired manually.

19. A system to facilitate interoperability between a first screen device and a second screen device, the system comprising:
a memory; and
a processor, coupled to the memory, to:
discover a first screen application operating on the first screen device and a plurality of coupling protocols available to connect to the first screen device;
provide a device list based on the discovering, the device list including a plurality of entries each associated with the first screen application and a respective coupling protocol of the plurality of coupling protocols;
obtain pairing information for the first screen application from a control server;
update the device list using the pairing information from the control server;
perform device deduplication using the updated device list to generate a deduplicated entry for the first screen application; and
present the deduplicated entry for the first screen application in a user interface.

20. The system of claim 19, wherein each of the plurality of entries associated with the first screen application includes an application identifier of the first screen application that is generated by the first screen application and provided to the second screen device in response to a discovery request of the second screen device.

21. The system of claim 19, wherein the pairing information for the first screen application identifies one or more client devices with which the first screen application has been paired manually using a passcode.

* * * * *